US012112863B2

(12) United States Patent
Carrolo Nuno et al.

(10) Patent No.: US 12,112,863 B2
(45) Date of Patent: Oct. 8, 2024

(54) TAPING HEAD

(71) Applicant: Aptiv Technologies Limited, St. Michael (BB)

(72) Inventors: Lopes José Carrolo Nuno, Lisbon (PT); Qiu Jianliang, Lisbon (PT); Rubén Marco Medeiros Ferreira Da Silva, Odivelas (PT); Miguel Sousa Borges Monteiro Pires, Lisbon (PT)

(73) Assignee: Aptiv Technologies AG, Schaffhausen (CH)

( * ) Notice: Subject to any disclaimer, the term of this patent is extended or adjusted under 35 U.S.C. 154(b) by 82 days.

(21) Appl. No.: 17/973,709

(22) Filed: Oct. 26, 2022

(65) Prior Publication Data

US 2023/0129360 A1 Apr. 27, 2023

(30) Foreign Application Priority Data

Oct. 27, 2021 (EP) .................................... 21205051
Oct. 24, 2022 (EP) .................................... 22203260

(51) Int. Cl.
*H01B 13/012* (2006.01)
*B65B 13/18* (2006.01)
*B65H 35/00* (2006.01)

(52) U.S. Cl.
CPC ..... *H01B 13/01281* (2013.01); *B65H 35/008* (2013.01); *B65B 13/18* (2013.01); *B65B 13/185* (2013.01); *B65B 13/187* (2013.01); *B65H 2701/377* (2013.01)

(58) Field of Classification Search
CPC .......... H01B 13/01281; B60R 16/0207; B29C 53/68; B29C 53/70; B65B 13/18; B65B 13/185; B65B 13/187
USPC ........................................................... 100/27
See application file for complete search history.

(56) References Cited

U.S. PATENT DOCUMENTS

| | | | |
|---|---|---|---|
| 6,119,749 | A | 9/2000 | Matsuzawa |
| 9,786,416 | B1 | 10/2017 | Kerstetter et al. |
| 2011/0017392 | A1 | 1/2011 | Erives |

FOREIGN PATENT DOCUMENTS

| | | | | | |
|---|---|---|---|---|---|
| CN | 108455356 | A | * | 8/2018 | ......... B65H 35/0033 |
| CN | 110444344 | A | * | 11/2019 | |
| DE | 102013205509 | A1 | | 10/2014 | |
| DE | 202015001990 | U1 | | 4/2015 | |
| DE | 202017102503 | U1 | * | 6/2017 | ............. B65H 81/06 |
| EP | 3503127 | A1 | | 6/2019 | |
| KR | 100802502 | B1 | | 2/2008 | |
| KR | 101976553 | B1 | | 5/2019 | |
| KR | 102003192 | B1 | | 10/2019 | |
| WO | 03013958 | A1 | | 2/2003 | |

OTHER PUBLICATIONS

Extended Search Report for Application No. 21205051.2; mailed May 24, 2022., 12 pages.

* cited by examiner

*Primary Examiner* — Carson Gross
(74) *Attorney, Agent, or Firm* — Billion & Armitage

(57) ABSTRACT

A taping head for taping a wire harness includes a base plate with a first aperture for receiving a wire harness. A tape dispenser with a second aperture is configured to rotate a roll of tape around the center of the first and second apertures. The taping head further includes a clamping unit configured to clamp a free end of the tape.

19 Claims, 6 Drawing Sheets

TAPING HEAD

CROSS-REFERENCE TO RELATED APPLICATION

This application claims benefit of priority to European Patent Application No. 22203260.9 filed on Oct. 24, 2022, and European Patent Application No. 21205051.2 filed on Oct. 27, 2021, the entire disclosure of each of which is hereby incorporated by reference.

TECHNICAL FIELD OF THE INVENTION

The present disclosure relates to a taping head for taping a wire harness.

BACKGROUND

Taping heads for taping a wire harness with a protective and/or adhesive tape are generally known. Such taping heads are used to manually or automatically wrap a tape around a bundle of wires. In industrial applications, there is a need to automatically apply the tape to different wire harnesses or to different sections of a wire harness which requires that a tape which is supplied from a roll of tape is cut and repositioned.

SUMMARY

The present disclosure provides a taping head for taping a wire harness with protective and/or adhesive tape of a roll of tape. The taping head includes a base plate with a first aperture for receiving the wire harness and a rotatable tape dispenser with a second aperture. The rotatable tape dispenser is rotatably mounted to the base plate and configured to rotate the roll of tape about the center of the first and second apertures. A clamping unit is provided for clamping the free end of the tape. The clamping unit includes an anvil fixedly mounted to the rotatable tape dispenser and a clamping element movably mounted to the base plate. It is possible to clamp the free end of the tape between the anvil and the clamping element for positioning the free end at a desired location when initiating the taping process by means of the movable clamping element and the anvil. Since the clamping unit is mounted to the base plate and the tape dispenser, respectively, the taping head can be designed to be very compact and light weight. The anvil is fixedly mounted to the rotatable tape dispenser and in particular is rigidly connected thereto. Thus, the anvil is not movable relative to the rotatable tape dispenser such that the tape can be firmly held between the anvil and the clamping element. However, the anvil rotates together with the rotatable tape dispenser, whereas the clamping element does not rotate with the rotatable tape dispenser, but instead is mounted on the base plate.

According to an embodiment, the clamping element includes a cutting blade. This provides the advantage that the free end of the tape can be cut and clamped with the clamping unit, i.e., with the same component. The cutting blade may include two cutting edges enclosing an obtuse angle of e.g., about 120°. Such a design allows an apex of the cutting blade to cut the tape at a location between the two outer edges of the tape to avoid a lateral shifting of the tape upon cutting.

According to an embodiment, the anvil includes a slot for receiving the cutting blade which improves the cutting and clamping of the free end of the tape. Since the anvil is not movable relative to the rotatable tape dispenser, the tape rests on the anvil and is also not moved when the cutting blade cuts the tape and enters the slot.

According to a further embodiment, the clamping element moves between an open position and a closed position the tape is released by the clamping unit in the open position and the tape is cut and simultaneously clamped between the clamping element and the anvil in the closed position. The clamping element may include a rotatable lever. The lever may be rotated to butt against the anvil for clamping and also to cut the tape end.

According to a further embodiment, the lever is rotatable at least 180°. This allows the lever to rotate from one side of the base plate to the opposing side where the tape dispenser is rotatably mounted. A space in front of the anvil is thereby not blocked by the clamping element which facilitates the handling of the taping head while taping. This provides a compact design of the rotatable tape dispenser since the mechanism for actuating the clamping element is affixed to the base plate rather than the rotatable tape dispenser.

According to a further embodiment, the clamping unit includes a gear rod and a gear wheel for rotating the clamping element. This also provides a compact design since the gear rod can be actuated by means of a linear actuator without the necessity of a further electric motor for rotating the clamping element.

According to a further embodiment, the tape dispenser includes a spring-loaded receptacle for accommodating the wire harness. The wire harness may be received in the receptacle and the taping head can be pushed against the wire harness without significantly deforming the wire harness when positioning the taping head on the wire harness. This allows a good positioning of the wire harness in the center of the first and second apertures.

According to a further embodiment, the receptacle forms a gap or slot for the tape. Thereby it is possible to feed the tape through the receptacle such that the tape can be positioned at the outer circumference of the wire harness when initiating the taping process.

According to a further embodiment, a guide roll is located adjacent to the gap for guiding the tape. The guide roll rotates about a first axis in order to feed the tape into the gap on a substantially linear path. The guide roll may pivot about a second axis that is generally perpendicular to the first axis. The first axis may be oriented in parallel to an axis of rotation of the rotatable tape dispenser. Such designs provide a proper orientation and guidance of the tape if the taping head is moved along the length of a wire harness.

According to a further embodiment, the receptacle has at least one wall that is concavely curved. Such contour corresponds to the outer contour of the wire harness and allows a safe positioning of the taping head next to the wire harness.

According to a further embodiment, a contact surface of the anvil is located adjacent an inlet of the second aperture of the tape dispenser. Thereby, it is possible to clamp the end of the tape in a position which is laterally shifted from the center of the second aperture, so as to avoid any undesired interference between the free end of the tape and the wire harness.

According to a further embodiment, the anvil and the clamping element include a protrusion and a slit for clamping the tape therebetween. The anvil may include the protrusion and the clamping element may include the slit or vice versa. Both variants improve the clamping of the tape between the anvil and the clamping element.

According to a further embodiment, at least one rotatable support lever is provided for supporting the wire harness received in the first and second apertures. Since the wire harness which is to be taped is not always fully stretched the support of the wire harness can be improved by a support lever to provide a substantially linear formation of the wire harness in the region to be taped.

According to an embodiment, two support levers are provided which can be rotated independently, e.g., by means of an actuator.

According to a further embodiment, the support lever may include a support roll for reducing friction between the support lever and the wire harness when moving the taping head along the length of the wire harness.

According to a further embodiment, two support levers are provided adjacent to opposing sides of the base plate. Such support levers do not need any additional clamping devices for tensioning the wire harness which reduces weight and improves the compactness of the taping head.

According to a further embodiment, the clamping element moves between an open position and a closed position, The clamping element secures the free end of the tape while the wire harness is located in the center of the first and second apertures when in the closed position the and the clamping element releases the tape prior to rotation of the tape dispenser when in the open position.

According to a further embodiment, the tape dispenser is rotated in a first rotational direction and a second rotational direction opposite the first rotational direction. The tape dispenser is rotated in the first rotational direction to wrap the free end of the tape around the wire harness to securely attach the tape to the wire harness. The tape dispenser is rotated in the second rotational direction and simultaneously the taping head is moved along a length of the wire harness to wrap a desired section of the wire harness with the tape.

According to a further embodiment, after the desired section of the wire harness is wrapped with the tape the taping head is moved away from the wire harness to position the tape against the anvil for clamping and also cutting the tape with the clamping element.

According to a further aspect of the disclosure, a method of wrapping an adhesive tape around a bundle of wires in a lengthwise direction is disclosed. In the method a taping head is used that includes a base plate with a first aperture and a rotatable tape dispenser with a second aperture. The rotatable tape dispenser is rotatably mounted to the base plate and is configured to rotate the roll of tape about the center of the first and second apertures. The taping head further includes a clamping unit configured to clamp a free end of the tape. The tape dispenser may include one or more features as disclosed in this application.

According to the disclosed method, the following steps are performed, in particular in the indicated order: First, a free end of the tape is clamped with the clamping unit. Thereafter, the taping head is manipulated such that the bundle of wires is located within the first and second apertures and the tape adheres to a circumferential section of the bundle of wires. Thereafter, the clamping element is released and the rotatable tape dispenser is rotated in a first direction for a period of time to fix the free end of the tape on the bundle of wires by wrapping the free end around the bundle. When the free end of the tape is fixed and wound around the bundle of wires, the rotatable tape dispenser is rotated in a second direction that is opposite to the first direction while the taping head is moved in parallel to the bundle of wires to wrap the tape around the bundle of wires in the lengthwise direction.

According to an embodiment, the base plate is not moved when the rotatable tape dispenser is rotated in the first direction. This allows to securely fix the comparatively short free end of the tape to the bundle of wires.

According to a further embodiment, the period of time is chosen such that a length of the tape that initially extends between the bundle of wires and the free end of the tape is completely wrapped around the bundle of wires.

According to a further aspect of the present disclosure a method of cutting a tape wrapped around a bundle of wires using a taping head is disclosed. The taping head includes a base plate with a first aperture and a rotatable tape dispenser with a second aperture. The rotatable tape dispenser is rotatably mounted to the base plate and is configured to rotate the roll of tape about the center of the first and second apertures. Further, the tape dispenser includes a clamping unit configured to clamp a free end of the tape. The rotatable tape dispenser may include one or more features as disclosed herein.

The method of cutting the tape includes the following steps, in particular in the indicated order: First, the taping head is moved away from the wrapped bundle of wires such that a length of tape extends between the first and second apertures and the wrapped bundle of wires. This allows slight tension of the tape between the roll of tape and the clamping unit. Thereafter, the taping head is manipulated such that the clamping unit contacts the length of tape at a location between the first and second apertures and the wrapped bundle of wires. Thereafter, the tape can be clamped by means of the clamping unit and cut.

According to an embodiment, the tape is simultaneously clamped and cut, for example by means of a clamping and cutting device.

According to a further embodiment, the tape is tensioned before it is clamped and cut.

BRIEF DESCRIPTION OF THE DRAWINGS

The present invention is now described, by way of example with reference to the accompanying drawings, in which.

DETAILED DESCRIPTION

Figure 1:
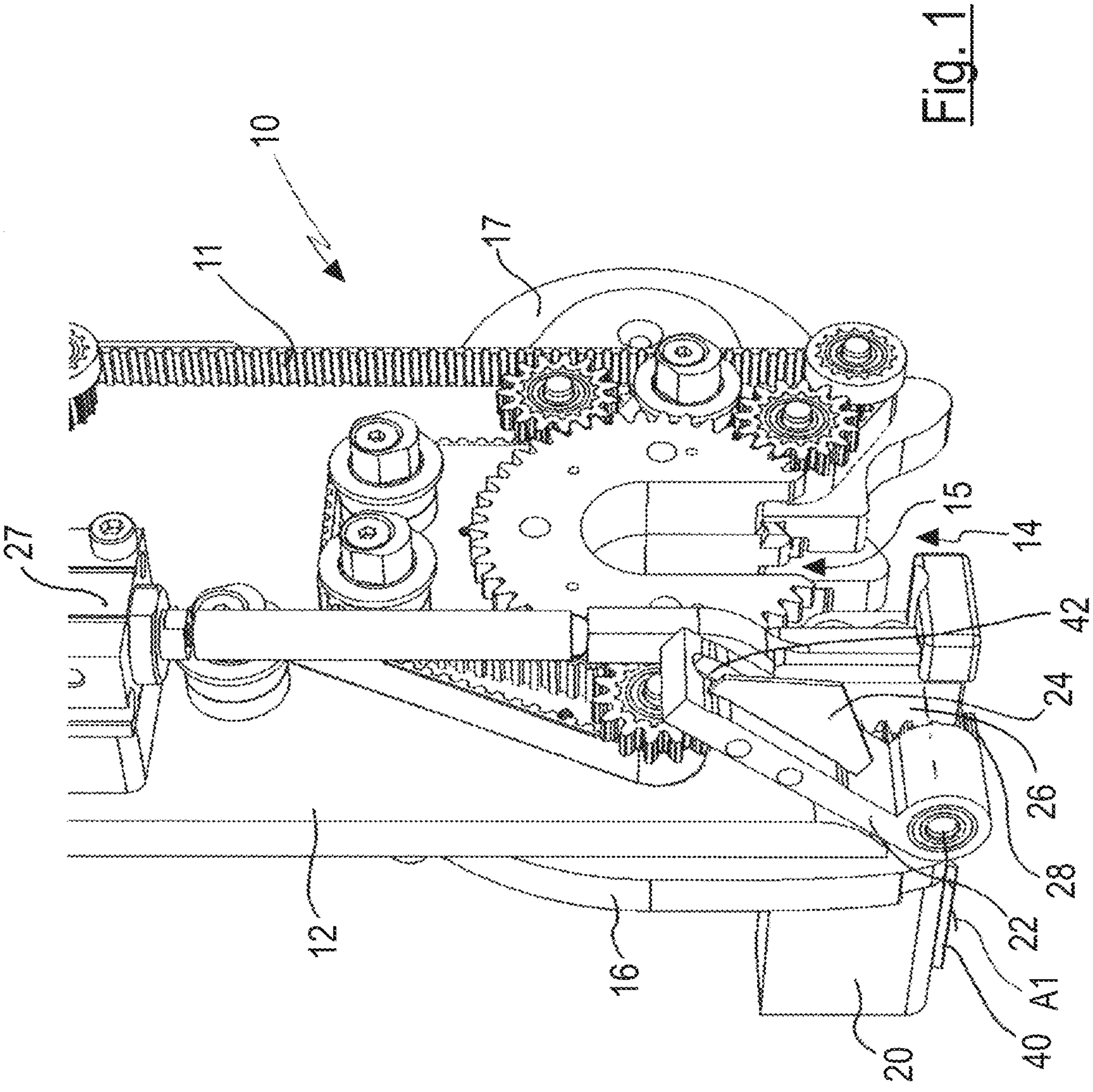
FIG. 1 shows an isometric view of a taping head according to an embodiment.

FIG. 1 depicts various steps of a process for providing a product with an overmold by means of injection molding. According to the illustrated example, the product is a cable 20 which is provided with an overmold of e.g., polyurethane foam material.

Figure 2:
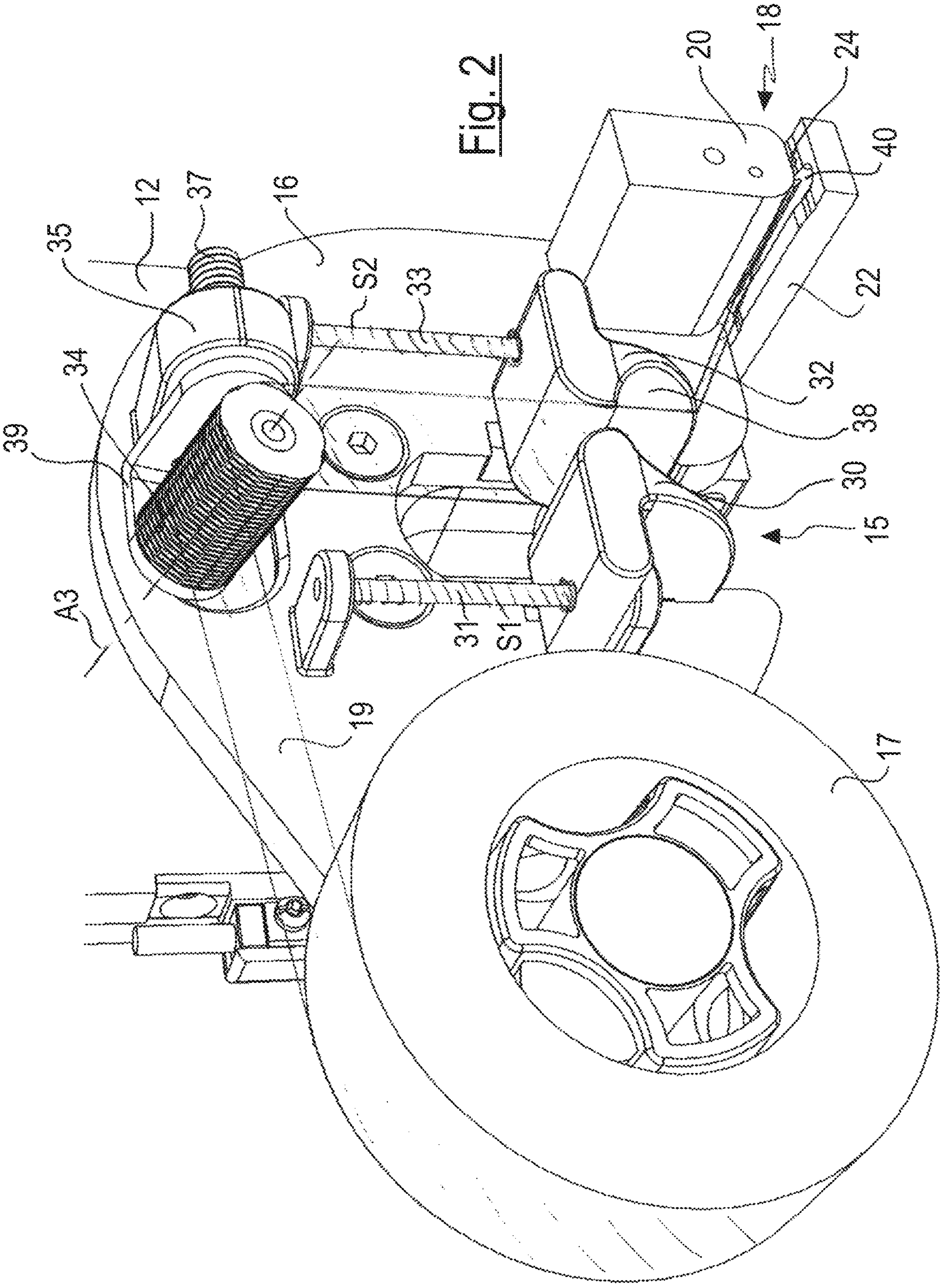
FIG. 2 shows an isometric view of a detail of the taping head of FIG. 1 according to an embodiment.
Figure 3:
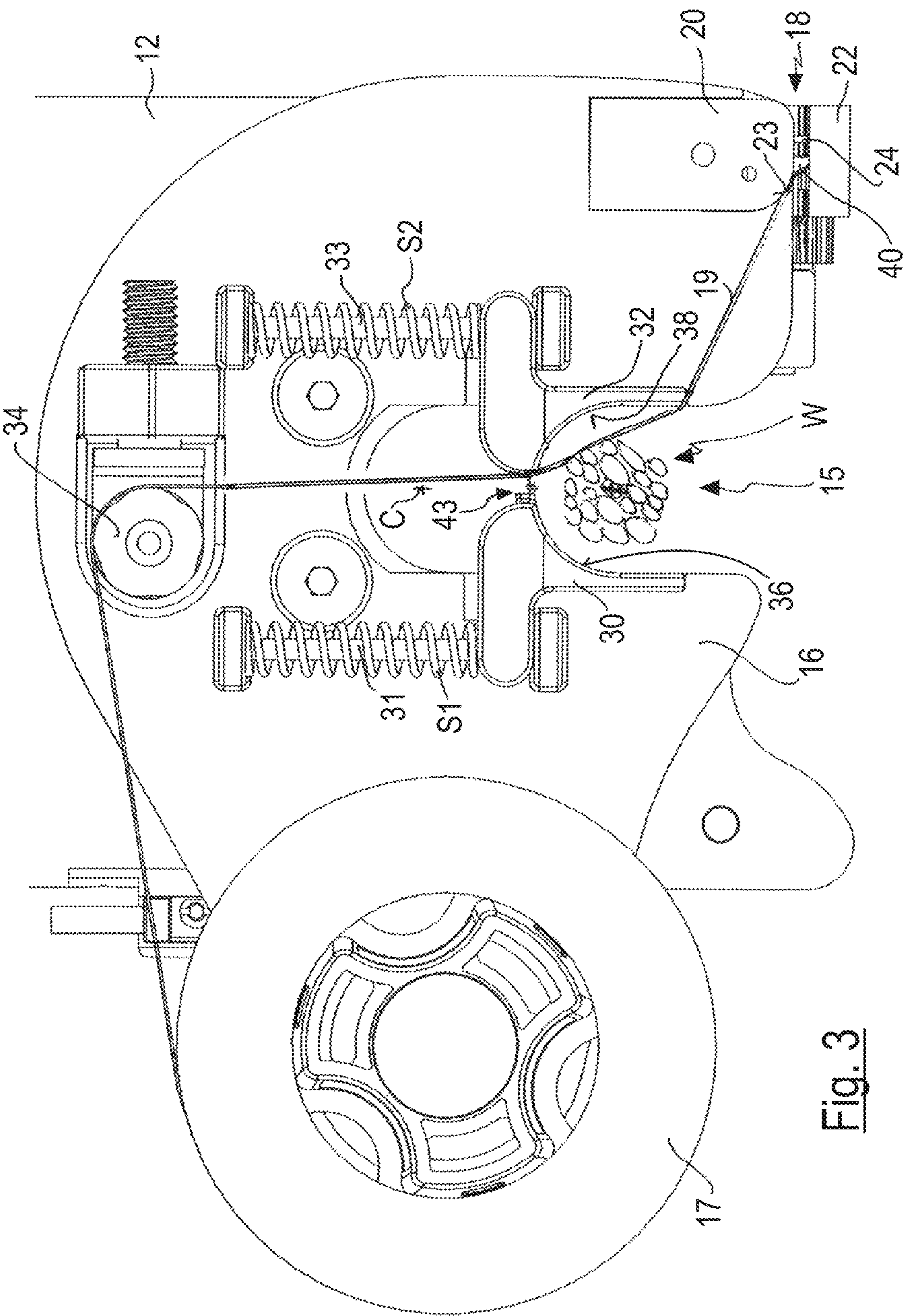
FIG. 3 shows a plan view of a detail of the taping head of FIGS. 1 and 2 according to an embodiment.

FIGS. 1 to 4 depict a taping head 10 for taping a wire harness W (FIG. 3). The taping head 10 includes a base plate 12 with a first aperture 14 for receiving the wire harness W. The first aperture 14 has the shape of a broad slit which extends to an outer edge of the base plate 12 with a dead end of the slit having a semi-circular shape. In other words, the first aperture 14 forms a generally U-shaped slot in the base plate 12. A tape dispenser 16 is configured to rotate a roll of tape 17 of e.g., adhesive tape around a center C (FIG. 3) of the first aperture 14. The tape dispenser 16, which also includes a second aperture 15 having the same general shape as the first aperture 14 of the base plate 12, is rotated around the center C by means of a motor M (FIG. 4) that rotates a drive pulley and the rotation of the drive pulley is transferred via a toothed belt 11 (FIG. 1) to the tape dispenser 16. It is appreciated that other mechanisms may alternatively be used for rotating the tape dispenser 16. When the tape dispenser 16 is rotated, the roll of tape 17 is also rotated around the center C. If a wire harness W is placed at the position of the center C of the first and second apertures 14, 15, tape 19 from the roll of tape 17 can be wrapped around the wire harness W by rotating the tape dispenser 16 relative to the base plate 12.

The tape dispenser 16 can be mounted to the base plate 12 using a quick change mount to allow an operator to easily swap out the tape dispenser 16 with another tape dispenser 16 once the roll of tape 17 is empty or if maintenance needs to be performed.

As shown in FIGS. 2 and 3 a free end of the tape 19 is unwound from the roll of tape 17 which is rotatably supported on the tape dispenser 16 and the free end of the tape 19 is guided by means of a guide roll 34 which is pivotally supported on a roll holder 35 mounted on the tape dispenser 16. The guide roll 34 rotates about an axis A3 and is loosely supported on the roll holder 35.

A spring-loaded receptacle including two members 30, 32 is provided for supporting and accommodating the wire harness W in the first and second apertures 14, 15. Due to the two members 30, 32 the receptacle forms a gap or slot 43 (FIG. 3) for feeding the tape 19 therethrough. The members 30 and 32 of the receptacle can be linearly shifted along a respective rod 31 and 33. The rods 31 and 33 are arranged in parallel to each other and each member 30, 32 of the receptacle is spring-loaded by means of a spring S1 and S2. Accordingly, if the taping head 10 is positioned next to the wire harness W and pushed against the wire harness W, the members 30, 32 of the receptacle will be pushed against the force of the springs S1 and S2 until the wire harness W is located at the center C of the first and second apertures 14, 15.

The members 30 and 32 of the receptacle each include an inner wall 36, 38 which is concavely curved such that the shape of the walls corresponds to the outer shape of the wire harness W. Furthermore, in the region of the gap 43 both members 30 and 32 include a rounded edge for slidingly guiding the tape 19.

A clamping unit 18 is provided in order to clamp and also cut the free end of the tape 19. The clamping unit 18 includes an anvil 20 and a clamping element 22. The anvil 20 is a block-like element fixedly mounted to the rotatable tape dispenser 16 and the clamping element 22 includes a rotatable lever mounted to the base plate 12. In particular, the anvil 20 is rigidly connected to the rotatable tape dispenser 16 and is not movable relative thereto. Accordingly, when the rotatable tape dispenser 16 is rotated relative to the base plate 12, the anvil 20 is rotated relative to the clamping element 22 that is mounted to the base plate 12. The free end of the tape 19 can be clamped between the anvil 20 and the clamping element 22 as shown in FIGS. 2 and 3. The rotatable lever can be rotated about an axis A1 which extends in parallel to the extension of the base plate 12 and the clamping element 22 can be rotated about at least 180° from the position shown in FIG. 1 (open position) to the position shown in FIGS. 2, 3 and 4 (closed or clamping position).

For rotating the clamping element 22 a gear rod 26 (FIG. 1) is provided which can be linearly shifted by means of an actuator 27. The linear movement of the gear rod 26 is converted into a rotational movement by means of a gear wheel 28 provided on the clamping element 22 such that the clamping element 22 rotates about the axis A1 if the actuator 27 is actuated to shift the gear rod 26.

As shown in FIG. 1, the clamping element 22 includes a substantially triangular cutting blade 24 and a slit 42 whereas the anvil 20 includes a slot 21 (shown in FIG. 5) for receiving the cutting blade 24 and a protrusion 40 for clamping the tape 19. The protrusion 40 is received in the slit 42 (FIG. 1) of the clamping element 22 when the clamping element 22 has reached the closed position. The tape 19 will be held and clamped between the protrusion 40 of the anvil 20 and the slit 42 of the clamping element 22. However, the tape 19 is not cut by the protrusion 40. The cutting is achieved by the cutting blade 24 received in the slot 21 of the anvil 20. The protrusion 40 and the slit 42 are positioned closer towards the first and second apertures 14, 15 and the slot 21 and the cutting blade 24 are positioned farther away from the first and second apertures 14, 15 such that when the clamping element 22 is in the closed position the tape 19 is cut, but the free end of the tape 19 is held and clamped between the protrusion 40 and the slit 42.

As shown in FIGS. 2 and 3 a contact surface 23 (FIGS. 3 and 5) of the anvil 20 is located adjacent an inlet of the second aperture 15 of the tape dispenser 16 such that the free end of the tape 19 is fixed at a location remote from the second aperture 15 to avoid interference with the wire harness W.

Figure 4:
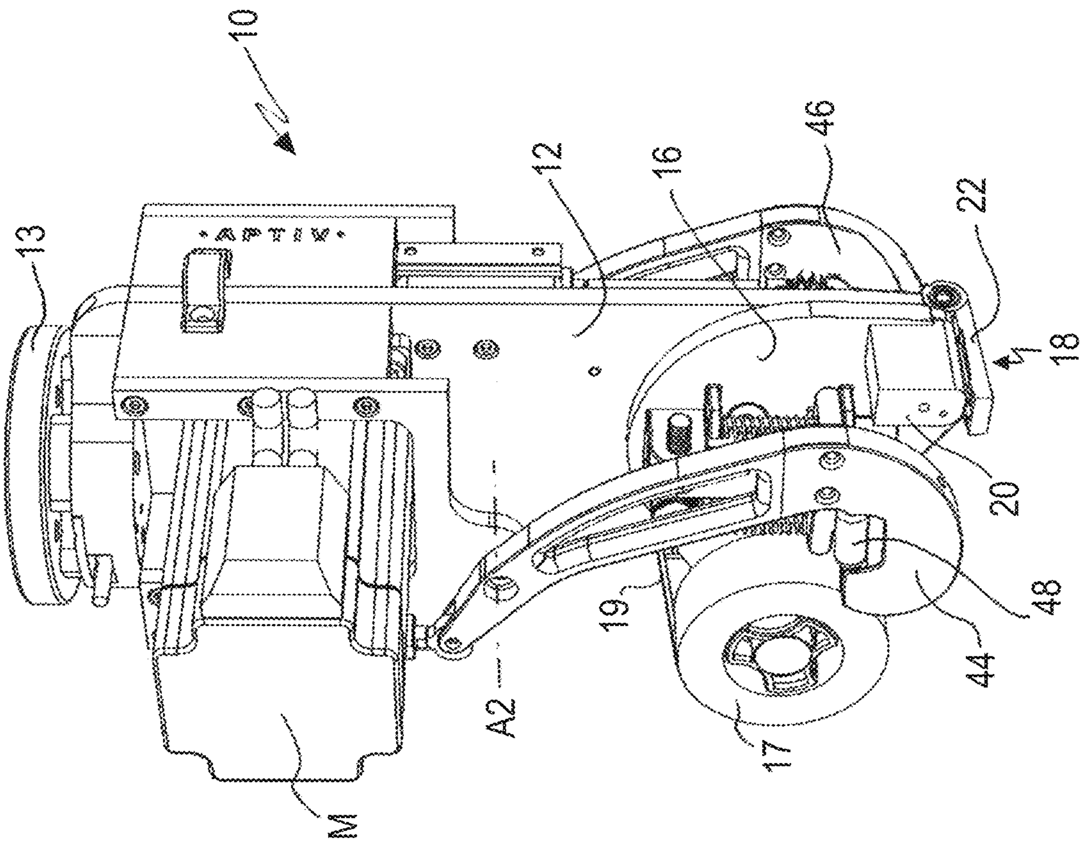
FIG. 4 shows an isometric view of a taping head according to an embodiment.

FIG. 4 shows a perspective view of a further embodiment. This embodiment corresponds to the embodiment of FIGS. 1 to 3 but includes two optional support levers 44 and 46 which are rotatable about an axis A2 running in parallel to the axis of the roll of tape 17 of the tape 19. Both support levers 44 and 46 can be independently swiveled about the axis A2 by means of a respective actuator. Each support lever 44, 46 includes a support roll 48 (FIG. 4) which can be located at the bottom side of the wire harness W after the wire harness W has been placed in the first and second apertures 14, 15. When the taping head 10 is moved along the length of the wire harness W, the wire harness W may slide on the support rolls 48.

Since the base plate 12 is provided with a quick mount 13 for mounting the base plate 12 to a robot arm, the positioning of the taping head 10 can be manipulated by means of a robot in an effective manner. Further, it is possible to move the taping head 10 along the length of the wire harness W during the taping process such that a desired section of the wire harness W is wrapped with the tape 19.

Figure 5:
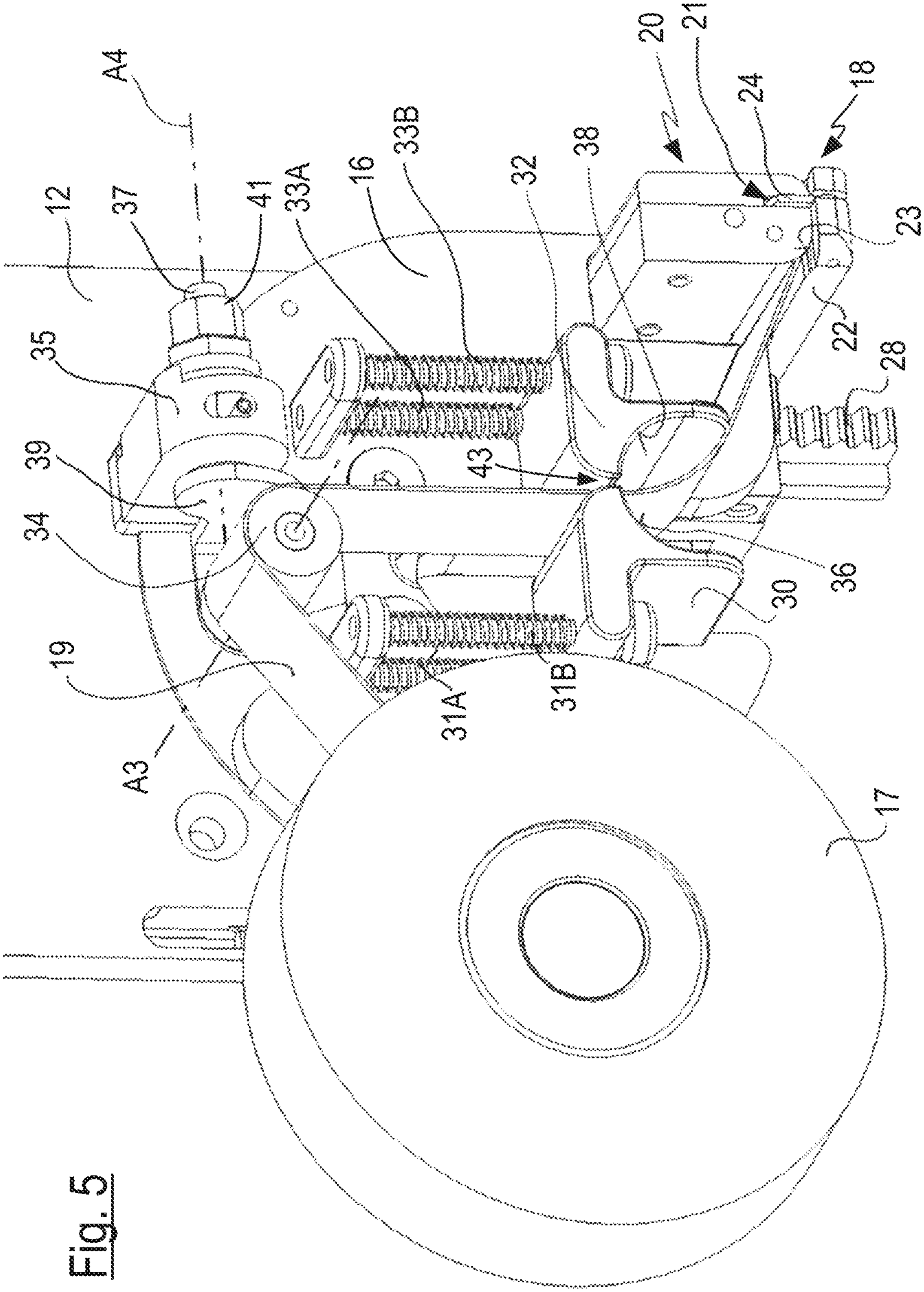
FIG. 5 shows another isometric view of a taping head according to an embodiment.

FIG. 5 depicts a further embodiment of a taping head that is similar to the taping head described above. In this embodiment, the guide roll 34 rotates about the axis A3 and pivots about a second axis A4 that is generally perpendicular to the first axis A3. The guide roll 34 can pivot about the second axis A4 to position the tape 19 as the tape dispenser 16 wraps the tape 19 around the wire harness W. In one embodiment, the guide roll 34 and the roll holder 35 are positioned such that the axis A3 and the axis A4 intersect. In an alternative embodiment, the guide roll 34 and the roll holder 35 are positioned such that the axis A3 is offset from the axis A4 such that the axis A3 and the axis A4 do not intersect. The roll holder 35 is mounted to the rotatable tape dispenser 16 and acts as a bearing for a shaft 37 that defines the axis A4. One side of the shaft 37 is provided with an L-shaped bracket 39 to which the guide roll 34 is mounted. The other end of the shaft 37 is provided with a nut 41 for securing the shaft 37 to the roll holder 35.

In this embodiment, each member 30, 32 of the receptacle is guided by a respective pair of rods 31A, 31B and 33A, 33B. Like in the first embodiment each member 30, 32 of the receptacle is spring-loaded by means of a spring that is provided at the circumference of each rod 31A, 31B, 33A, 33B. It is appreciated that a spring may be provided on one of the pair of rods 31A, 31B and one of the pair of rods 33A, 33B.

Figure 6A:
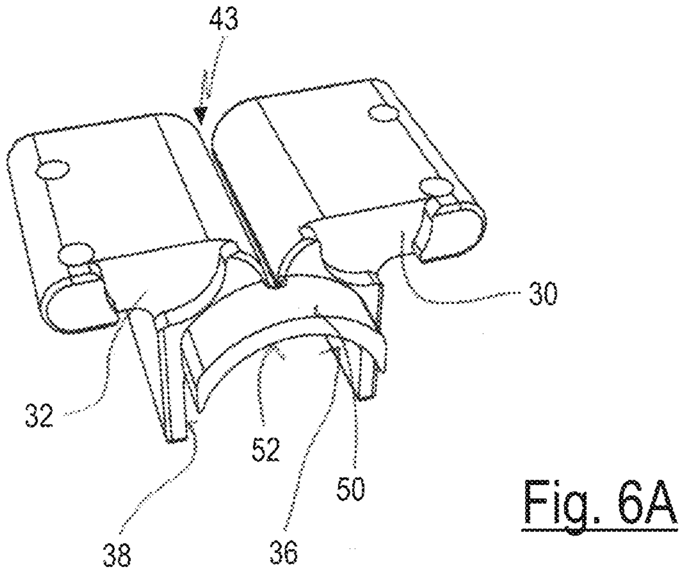
FIGS. 6A and 6B show isometric views of a detail of a taping head according to an embodiment.
Figure 6B:
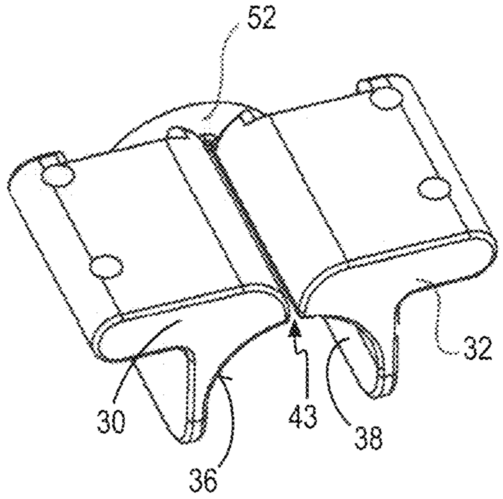

According to a further embodiment, the receptacle is not composed of two separate members but integrally formed, as shown in FIGS. 6A and 6B. In this embodiment, the members 30 and 32 still form a gap or slot 43 therebetween for guiding the tape 19. However, in this embodiment both members 30 and 32 are connected by means of a concavely curved web 50 having a curved wall 52 that is coplanar with the inner walls 36 and 38 of the members 30 and 32. The web 50 connects the two members 30 and 32. The gap or slot 43 may slightly extend into the web 50. As shown in FIGS. 6A and 6B, the surfaces on both sides of the gap or slot 43 are curved to allow the tape 19 to smoothly slide over these surfaces during taping.

When a taping process is initiated, the clamping element 22 is in the closed position such that the free end of the tape 19 is held between the clamping element 22 and the anvil 20 (see e.g., FIG. 5). The taping head 10 is located above the wire harness W and moved towards the wire harness W such that the wire harness W touches the walls 36, 38 of the members 30, 32 of the receptacle (see FIG. 3). As the taping head 10 is moved further downwards against the wire harness W, the members 30 and 32 are pushed upwards against the forces of the springs S1 and S2 such that the tape 19 contacts the wire harness W. The actuator 27 is actuated to rotate the clamping element 22 from the closed position shown in FIG. 2 to the open position shown in FIG. 1 after the wire harness W is fully received in the first and second apertures 14, 15, thereby releasing the free end of the tape 19. The tape dispenser 16 is then rotated around the center C in a first rotational direction (clockwise in FIG. 3) whereby the free end of the tape 19 is wrapped around the wire harness W in the first rotational direction. During this rotation, the inner wall 38 of the receptacle presses the free end of the tape 19 against the wire harness W while wrapping the free end around the wires. During this process step the taping head 10 is not or not substantially moved in a lengthwise direction (parallel to the wire harness W). Once the free end of the tape 19 is wrapped around the wire harness W a sufficient amount to secure the tape 19 to the wire harness W, the rotation of the tape dispenser 16 in the first rotational direction is stopped. The tape dispenser 16 is then rotated around the center C in a second rotational direction (counter-clockwise in FIG. 3), opposite the first rotational direction, whereby the tape 19 is wrapped around the wire harness W in the second rotational direction. Simultaneously with the rotation of the tape dispenser 16 in the second rotational direction, the taping head 10 is moved along a length of the wire harness W such that a desired section of the wire harness W is wrapped with the tape 19.

After the desired section of the wire harness W has been wrapped with the tape 19, the taping head 10 is moved away from the wire harness W which causes a length of tape 19 to extend between the wire harness W and the taping head 10. The taping head 10 is then moved into a position such that the tape 19 is guided over the contact surface 23 of the anvil 20 with the tape 19 being slightly tensioned such that no loops or undulations occur. Thereafter, the clamping element 22 is rotated about the axis A1 by means of the actuator 27 and the tape 19 is cut and simultaneously clamped between the clamping element 22 and the anvil 20.

The taping head described above is very compact and light weight. The taping head can be used with standard taping rolls with tape that is adhesive on one side or on both sides and the taping process can be done automatically by means of a robot. The clamping and the cutting of the tape is done automatically.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A taping head for taping a wire harness with tape of a roll of tape, said taping head comprising:

- a base plate with a first aperture for receiving the wire harness,
- a rotatable tape dispenser with a second aperture, the rotatable tape dispenser rotatably mounted to the base plate and configured to rotate the roll of tape about a center of the first and second apertures, and
- a clamping unit configured to clamp a free end of the tape, wherein the clamping unit includes an anvil fixedly mounted to the rotatable tape dispenser and a clamping element movably mounted to the base plate.

2. The taping head according to claim 1, wherein the clamping element moves between an open position and a closed position, wherein in the open position the clamping unit releases the tape, and wherein in the closed position the tape is cut and simultaneously clamped between the clamping element and the anvil.

3. The taping head according to claim 1, wherein the clamping element includes a rotatable lever.

4. The taping head according to claim 1, wherein the clamping unit includes a gear rod and a gear wheel for rotating the clamping element.

5. The taping head according to claim 1, wherein the tape dispenser includes a spring-loaded receptacle for accommodating the wire harness.

6. The taping head according to claim 5, wherein the receptacle has at least one wall that is concavely curved.

7. The taping head according to claim 5, wherein the receptacle forms a gap for the tape.

8. The taping head according to claim 7, further comprising a guide roll located adjacent to the gap for guiding the tape, wherein the guide roll is rotatable about a first axis.

9. The taping head according to claim 8, wherein the guide roll pivots about a second axis that is generally perpendicular to the first axis.

10. The taping head according to claim 9, wherein the first axis is offset from the second axis such that the first axis and the second axis do not intersect.

11. The taping head according to claim 1, wherein a contact surface of the anvil is located adjacent to an inlet of the second aperture of the tape dispenser.

12. The taping head according to claim 1, wherein the anvil and the clamping element include a protrusion and a slit for clamping the tape therebetween.

13. The taping head according to claim 1, further comprising at least one rotatable support lever for supporting the wire harness received in the first and second apertures, wherein in particular two support levers are provided adjacent two opposing sides of the base plate.

14. A method of wrapping an adhesive tape around a bundle of wires in a lengthwise direction using the taping head of claim 1, the method comprising:

- clamping the free end of the tape with the clamping unit;
- manipulating the taping head such that the bundle of wires is located within the first and second apertures and the tape adheres to a circumferential section of the bundle of wires;
- releasing the clamping unit;
- rotating the rotatable tape dispenser in a first direction for a period of time to fix the free end of the tape on the bundle of wires; and
- thereafter rotating the rotatable tape dispenser in a second direction that is opposite to the first direction while moving the taping head parallel to the bundle of wires to wrap the tape around the bundle of wires in the lengthwise direction.

15. The method according to claim 14, wherein the base plate is not moved when the rotatable tape dispenser is rotated in the first direction.

16. The method according to claim 14, wherein the period of time is chosen such that a length of the tape that initially extends between the bundle of wires and the free end of the tape is completely wrapped around the bundle of wires.

17. A method of cutting a tape wrapped around a bundle of wires using the taping head of claim 1, the method comprising:

- moving the taping head away from the wrapped bundle of wires such that a length of tape from the roll of tape extends between the first and second apertures and the wrapped bundle of wires;
- manipulating the taping head such that the clamping unit contacts the length of tape at a location between the first and second apertures and the wrapped bundle of wires; and
- clamping the length of tape by means of the clamping unit and cutting the tape.

18. The method of claim 17, wherein the tape is simultaneously clamped and cut.

19. The method of claim 17, wherein the tape is tensioned before it is clamped and cut.

* * * * *